US008714372B2

(12) United States Patent
Yogev (10) Patent No.: US 8,714,372 B2
(45) Date of Patent: May 6, 2014

(54) KIT FOR ASSEMBLING A RIGID SUPPORT STRUCTURE

(71) Applicant: Huliot Storage Solutions Ltd., Upper Galilee (IL)

(72) Inventor: Ilan Yogev, Upper Galilee (IL)

(73) Assignee: Huliot Storage Solutions Ltd., Upper Galilee (IL)

( * ) Notice: Subject to any disclaimer, the term of this patent is extended or adjusted under 35 U.S.C. 154(b) by 0 days.

(21) Appl. No.: 13/778,895

(22) Filed: Feb. 27, 2013

(65) Prior Publication Data

US 2013/0168341 A1    Jul. 4, 2013

Related U.S. Application Data

(63) Continuation-in-part of application No. PCT/IL2011/000949, filed on Dec. 14, 2011.

(30) Foreign Application Priority Data

Dec. 16, 2010  (IL) .......................................... 210039
Feb. 28, 2012  (IL) .......................................... 218368

(51) Int. Cl.
*A47G 29/00*   (2006.01)
*A47B 96/06*   (2006.01)

(52) U.S. Cl.
USPC ................... 211/71.01; 248/220.21; 312/245; 211/182

(58) Field of Classification Search
USPC ............. 211/71.01, 90.02, 94.01, 94.02, 103, 211/182, 183, 187, 190, 191, 192, 207; 248/220.21, 220.22, 225.11, 243, 245; 108/106–110
See application file for complete search history.

(56) References Cited

U.S. PATENT DOCUMENTS

| 1,288,010 | A | * | 12/1918 | Isaac .......................... 108/147.17 |
| 3,179,257 | A | * | 4/1965 | Tassell ............................ 211/193 |
| 3,200,962 | A | * | 8/1965 | Davelaar ........................ 211/190 |
| 3,250,584 | A | * | 5/1966 | Tassell ............................ 312/247 |
| 3,391,795 | A | * | 7/1968 | Finlayson ...................... 211/134 |
| 3,702,137 | A | * | 11/1972 | Evans .............................. 11/192 |
| 3,846,944 | A | * | 11/1974 | Lambert ....................... 52/236.3 |
| 3,896,743 | A | * | 7/1975 | Pariente ........................ 108/190 |
| D247,801 | S |   | 5/1978 | Bulanda et al. |
| 4,113,110 | A | * | 9/1978 | Mittag .......................... 211/191 |
| D362,176 | S |   | 9/1995 | Solbeck |
| D378,349 | S |   | 3/1997 | Saito et al. |

(Continued)

FOREIGN PATENT DOCUMENTS

| EP | 1293148 A1 | 3/2003 |
| EP | 1862093 A1 | 12/2007 |
| GB | 540866 B2 | 11/1941 |
| GB | 1435849 B2 | 5/1976 |

*Primary Examiner* — Joshua Rodden
(74) *Attorney, Agent, or Firm* — Novick, Kim & Lee, PLLC; Harold L. Novick (57) ABSTRACT

Kit for assembling a rectangular rigid support structure including a pair of vertical support rails and an upper spacer and a base spacer. The two spacers are rigidly attachable to and space apart the pair of vertical support rails. The spacers have spacer ends with integrally formed inter-engagement arrangements for mechanical inter-engagement with and attachment to the support rails. The inter-engagement arrangements include one or more integrally formed projections intended for insertion into the support rails. The spacers in the kit each have two pieces that can be rigidly assembled together.

3 Claims, 9 Drawing Sheets

(56) References Cited

U.S. PATENT DOCUMENTS

| | | | |
|---|---|---|---|
| D381,258 S | 7/1997 | Saito | |
| 5,660,637 A * | 8/1997 | Dodge | 118/500 |
| 5,901,523 A * | 5/1999 | Tasi | 52/653.2 |
| 5,957,060 A * | 9/1999 | Rosenband | 108/107 |
| D416,189 S | 11/1999 | Bollman | |
| 6,216,891 B1 * | 4/2001 | Kreuzer | 211/182 |
| D451,789 S | 12/2001 | Hsieh | |
| D456,699 S | 5/2002 | Nakanishi | |
| 6,612,664 B2 * | 9/2003 | Pryor et al. | 312/198 |
| D500,245 S | 12/2004 | Okada | |
| 7,207,759 B2 | 4/2007 | Kato | |
| D589,333 S | 3/2009 | Nakazato | |
| D629,105 S | 12/2010 | Horton | |
| D629,520 S | 12/2010 | Horton | |
| D629,904 S | 12/2010 | Horton | |
| D648,210 S | 11/2011 | Reynoso | |
| D664,027 S | 7/2012 | Vosika et al. | |
| D674,273 S | 1/2013 | Yogev | |
| 2003/0168951 A1 * | 9/2003 | Holbrook et al. | 312/245 |
| 2011/0215212 A1 * | 9/2011 | Keyvanloo | 248/220.22 |
| 2012/0193314 A1 * | 8/2012 | Liao | 211/183 |

* cited by examiner

KIT FOR ASSEMBLING A RIGID SUPPORT STRUCTURE

FIELD OF THE INVENTION

The invention relates to modular storage systems having storage bins.

BACKGROUND OF THE INVENTION

Huliot Storage Solutions Ltd., Kibbutz Sdeh Nehemia, Israel www.huliot-storage.com manufactures a wide array of modular storage systems having one or more storage bins. The modular storage systems are suitable for direct wall mounting or mounting on one or more support rails. The support rails are preferably extruded aluminum profiles. When more than one storage bin is used in a modular storage system, the storage bins may be arranged either side-by-side horizontally or vertically stacked. The support rails can be directly wall mounted or alternatively form part of a hanging frame, a single sided stand, a double sided stand, a table stand, a portable frame, and the like. The storage bins are mounted on the support rails by means of fastening screws and fastening elements. The use of fastening screws and fastening elements for mounting purposes requires the use of a screw driver and is time consuming and cumbersome.

SUMMARY OF THE INVENTION

The present invention is directed toward modular storage systems employing discrete one-piece stud-like fasteners for readily mounting one or more storage bins onto a pair of spaced apart vertical support rails. Commonly owned U.S. No. D674,273 to Yogev entitled Mechanical Connector for Connecting Units to a Support Rail provides design protection for the ornamental design of the stud-like fasteners of the present invention. The discrete stud-like fasteners replace hitherto employed fastening screws and fastening elements and do not require the use of a screw driver. The discrete stud-like fasteners can be made of any suitable rigid material including inter alia plastics, polymers, metal, or any combination thereof. The stud-like fasteners are inserted through a storage bin's hanging slots from its rear side into the storage bin cavity in an opposite manner to hitherto employed fastening screws. The stud-like fasteners afford more efficient mounting of storage bins compared to hitherto employed fastening screws and fastening elements. Moreover, the stud-like fasteners afford a low cost alternative to the hitherto described fastening screws and fastening elements. The stud-like fasteners are designed for mounting additional storage bins on existing support rails.

The present invention is also directed toward kits for assembling a rectangular rigid support structure including an upper spacer and a base spacer for spacing apart a pair of vertical support rails. The kits of the present invention preferably include identical spacers which can be interchangeably used either as an upper spacer or a base spacer. Alternatively, the kits of the present invention can include purpose designed upper and base spacers.

The spacers of the present invention are designed to be used with conventional support rails and hitherto mentioned conventional fastening arrangements, namely, fastening screws and fastening elements or U.S. No. D674,273 discrete one-piece stud-like fasteners. The spacers of the present invention include spacer ends with integrally formed inter-engagement arrangements for mechanical inter-engagement with conventional support rails for affording a sturdier support structure than a conventional support structure. The inter-engagement arrangements include one or more integrally formed projections intended for snug insertion into the support rails. The spacers of the present invention are preferably rigidly assembled from a left spacer member and a right spacer member by a screw, a snap-fit, and the like.

BRIEF DESCRIPTION OF DRAWINGS

In order to understand the invention and to see how it can be carried out in practice, preferred embodiments will now be described, by way of non-limiting examples only, with reference to the accompanying drawings in which similar parts are likewise numbered, and in which.

DETAILED DESCRIPTION OF DRAWINGS

Conventional Modular Storage System

Figure 1:
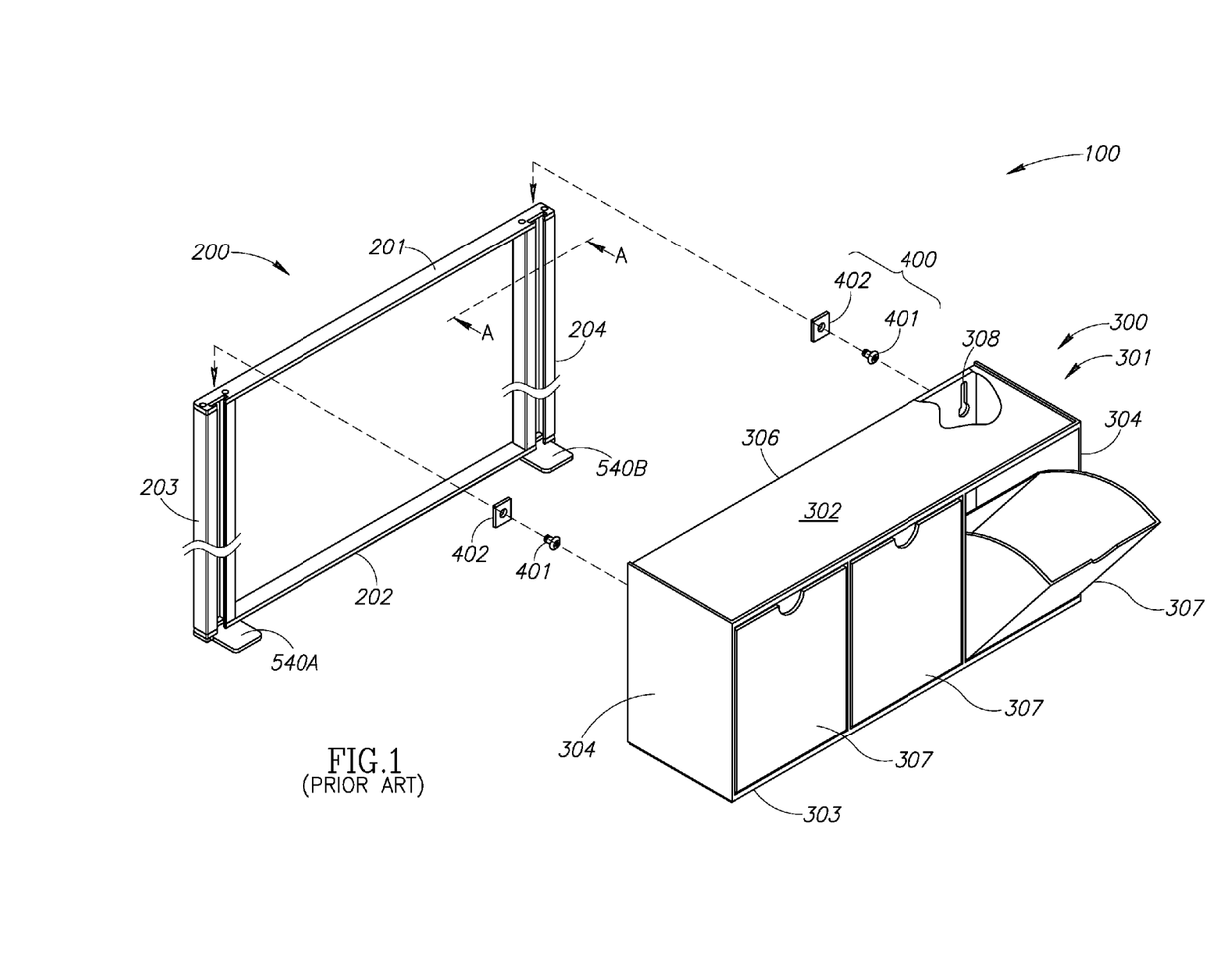
FIG. 1 shows a front perspective view of a conventional modular storage system including a support structure having a pair of spaced apart left and right vertical support rails, a storage bin, a pair of fastening screws and a pair of fastening elements.

FIG. 1 shows a conventional modular storage system 100 including a rectangular rigid support structure 200 for supporting one or more storage bins 300 stacked in a vertical arrangement. The modular storage system 100 includes fastening devices 400 for mounting storage bins 300 on the support structure 200. The fastening devices 400 include fastening screws 401 and fastening elements 402.

The support structure 200 includes a horizontal upper spacer 201 and a horizontal base spacer 202 for spacing apart a pair of left and right vertical support rails 203 and 204. The base spacer 202 may be configured for use in a stationary modular storage system, or alternatively, in a portable modular storage system.

The storage bin 300 is preferably made from plastic and includes a shell 301 including a top storage bin wall 302, a bottom storage bin wall 303, a pair of side storage bin walls 304, and a rear storage bin wall 306. The storage bin 300 includes three compartment drawers 307 for storage purposes. The compartment drawers 307 are removable for inter alia assembly purposes for mounting the storage bin 300 on the support structure 200.

Figure 6:
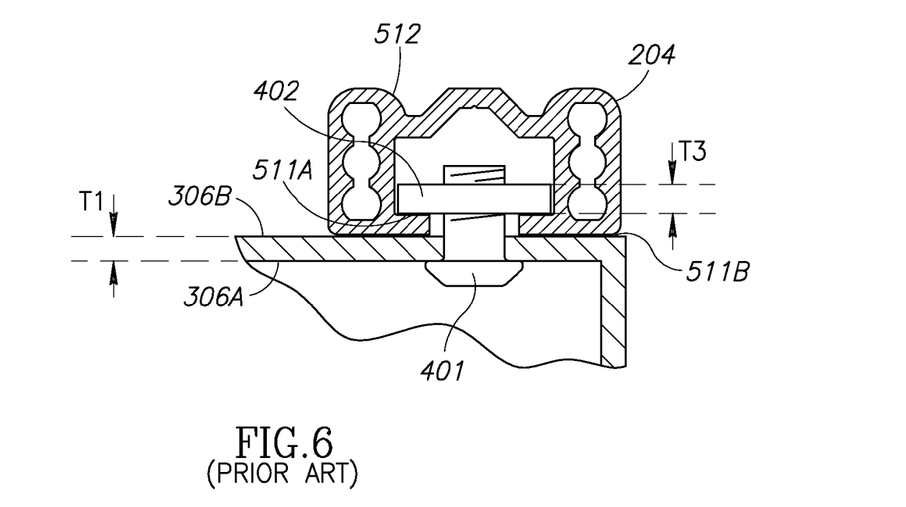
FIG. 6 is a transverse cross section of FIG. 1's support rail along line A-A showing the use of the fastening screw and the fastening element for mounting the storage bin on the right vertical support rail.

The rear storage bin wall 306 has a wall thickness T1 and opposite internal and external rear storage bin surfaces 306A and 306B respectively facing away from and towards the support structure 200 on mounting the storage bin 300 thereon (see FIG. 6). The rear storage bin wall 306 is formed with a pair of spaced apart throughgoing hanging slots 308 for registration with the left and right vertical support rails 203 and 204.

Figure 2:
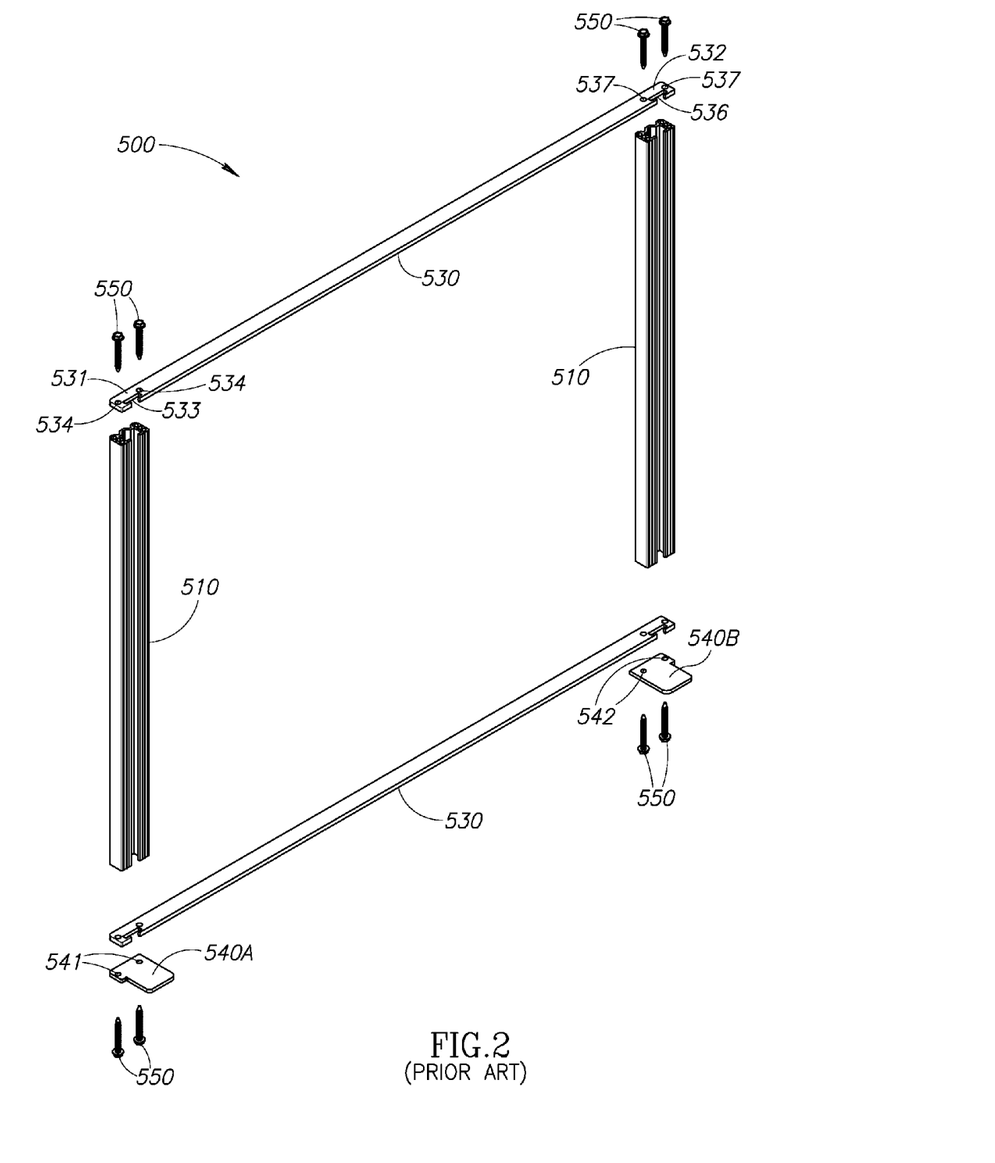
FIG. 2 shows a kit for assembling FIG. 1's support structure.

FIG. 2 shows a kit 500 for assembling the support structure 200 including the following list of parts:
(a) Pair of identical support rails 510 for use as left and right vertical support rails 203 and 204
(b) Pair of identical spacers 530 for use as upper spacer 201 and base spacer 202
(c) Left and right end plates 540A and 540B
(d) Eight support rail screws 550

Figure 3:
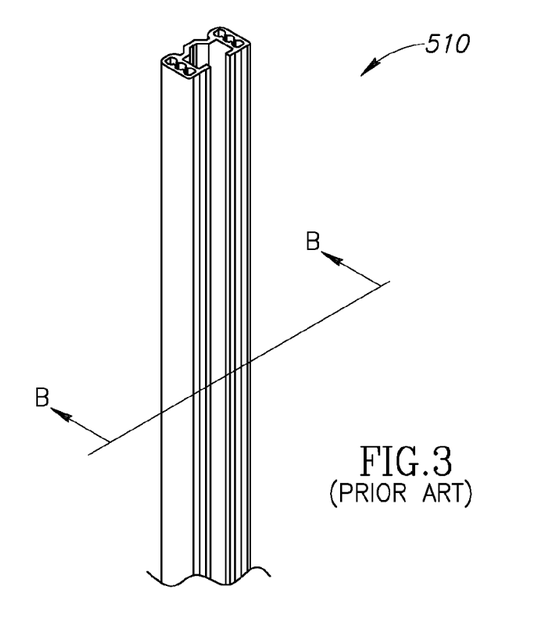
FIG. 3 is a perspective view of a support rail.
Figure 4:
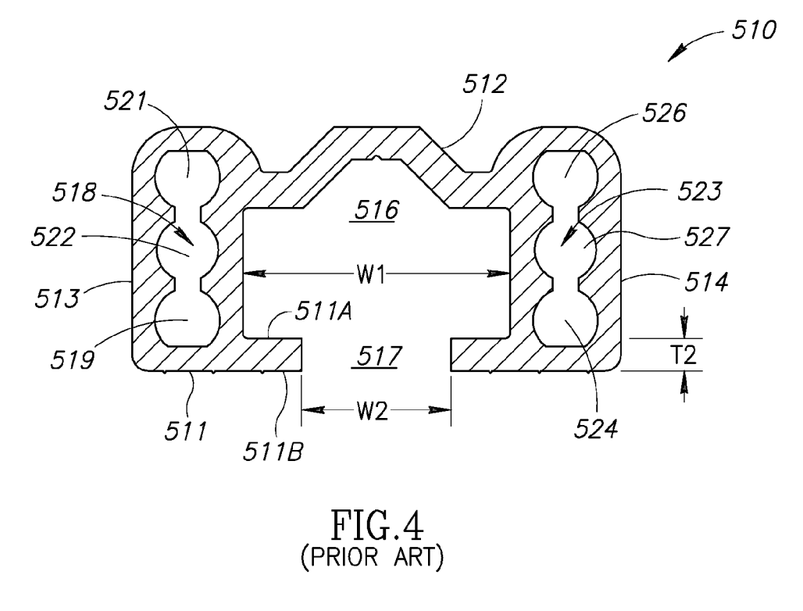
FIG. 4 is a transverse cross section of FIG. 3's support rail along line B-B.

FIGS. 3 and 4 show the support rails 510 are preferably extruded aluminum profiles having a generally U-shaped transverse cross-section. The support rails 510 include a front support rail wall 511, a rear support rail wall 512 and opposite left and right support rail walls 513 and 514 extending between the front support rail wall 511 and the rear support rail wall 512. The front support rail wall 511 has opposite internal and external surfaces 511A and 511B respectively facing towards and away from the rear support rail wall 512.

The support rails 510 are each formed with a longitudinal directed support rail channel 516 having a longitudinal directed support rail slot 517 formed in the front support rail wall 511. The support rail channel 516 has a width W1 and the support rail slot 517 has a width W2 where W1>W2. The front support rail wall 511 has a wall thickness T2. The fastening elements 402 have a width W1 for being snugly received in the support rail channels 516 for sliding down therealong.

Each left support rail wall 513 has a longitudinal directed channel 518 including a front channel segment 519 adjacent the front support rail wall 511, a rear channel segment 521 adjacent the rear support rail wall 512 and an intermediate channel segment 522 connecting the front channel segment 519 and the rear channel segment 521. The right support rail wall 514 has a longitudinal directed channel 523 including a front channel segment 524 adjacent the front support rail wall 511, a rear channel segment 526 adjacent the rear support rail wall 512 and an intermediate channel segment 527 connecting the front channel segment 524 and the rear channel segment 526.

FIG. 2 shows the spacers 530 are preferably aluminum struts including opposite left and right spacer ends 531 and 532. The spacer end 531 includes a T-shaped cutaway 533 and a pair of throughgoing holes 534 for screw threading a pair of support rail screws 550 therethrough into the intermediate channel segments 522 and 527 of the left vertical support rail 203 such that the T-shaped cutaway 533 aligns with the left vertical support rail's support rail wall channel 516 and the support rail channel 517. The spacer end 532 includes a T-shaped cutaway 536 and a pair of throughgoing holes 537 for screw threading a pair of support rail screws 550 therethrough into the intermediate channel segments 522 and 527 of the right vertical support rail 204 such that the T-shaped cutaway 536 aligns with the right vertical support rail's support rail wall channel 516 and the support rail channel 517. The T-shaped cutaways 533 and 536 are shaped and dimensioned to enable fastening elements 402 to slide therethrough into their underlying support rail wall channels 516.

The left end plate 540A includes a pair of throughgoing holes 541 for registration with the intermediate channel segments 522 and 527 of the left support rail 203. The right end plate 540B includes a pair of throughgoing holes 542 for registration with the intermediate channel segments 522 and 527 of the right support rail 204.

Assembly of the kit 500 to form the support structure 200 includes the following steps: Four support rail screws 550 are employed for mounting a spacer's left spacer end 531 onto the left vertical support rail 203 and its right spacer end 532 onto the right vertical support rail 204 to form the upper spacer 201. Two support rail screws 550 are employed for mounting the other spacer's left spacer end 531 and the left end plate 540A onto the left vertical support rail 203. Two support rail screws 550 are employed for mounting the other spacer's right spacer end 532 and right end plate 540B onto the right vertical support rail 204 to form the lower spacer 202.

Figure 5:
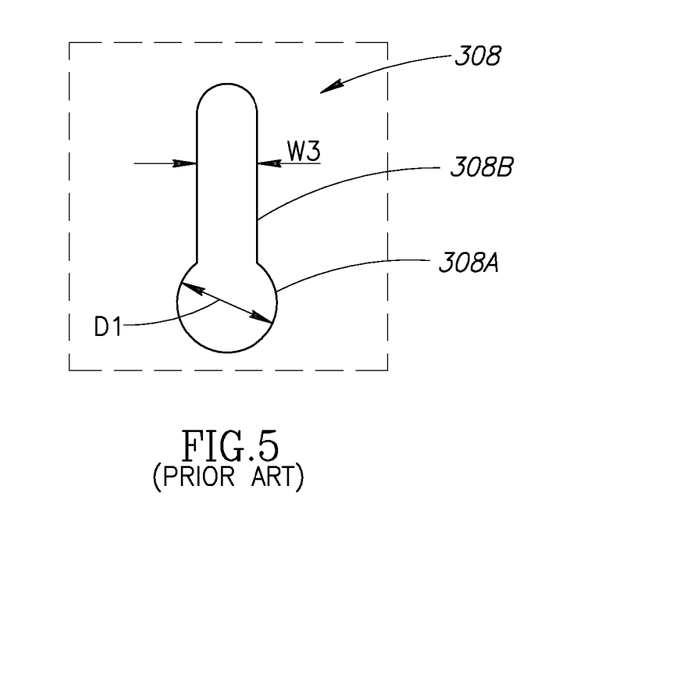
FIG. 5 is a close up view of an inverted keyhole shaped hanging slot of FIG. 1's storage bin.

FIG. 5 shows the hanging slots 308 have an inverted keyhole shape including a lowermost circular aperture 308A and an elongated upright narrow aperture 308B. The aperture 308A has a diameter D1. The aperture 308B has a width W3 where W2>W3 and D1>W3.

FIG. 6 shows a fastening element 402 has a thickness T3.

Mounting a storage bin 300 on the support structure 200 includes the following steps: A user removes the compartment drawers 307 from the storage bin 300 to afford access to the throughgoing hanging slots 308. The user pushes the fastening screws 401 outwards from the shell 301 through the hanging slots 308 and screw engages the fastening elements 402 facing the external rear storage bin surface 306B. The user holds the storage bin 300 above the support structure 200 such that the external rear storage bin surface 306B faces the left and right vertical support rails 203 and 204. The user aligns the support structure 200 with the left and right vertical support rails 203 and 204 such that the fastening elements 402 are in registration with the support rail channels 516. The user lowers the storage bin 300 such that the fastening elements 402 slide down the support rail channels 516 until the storage bin 300 stops on the end plates 540A and 540B. The user proceeds to tighten the fastening screws 401 inside the shell 301 such that their heads bear against the internal rear storage bin surface 306A and the fastening elements 402 bear against the internal surface 511A (see FIG. 6).

Discrete One-Piece Stud-Like Fasteners

Figure 7:
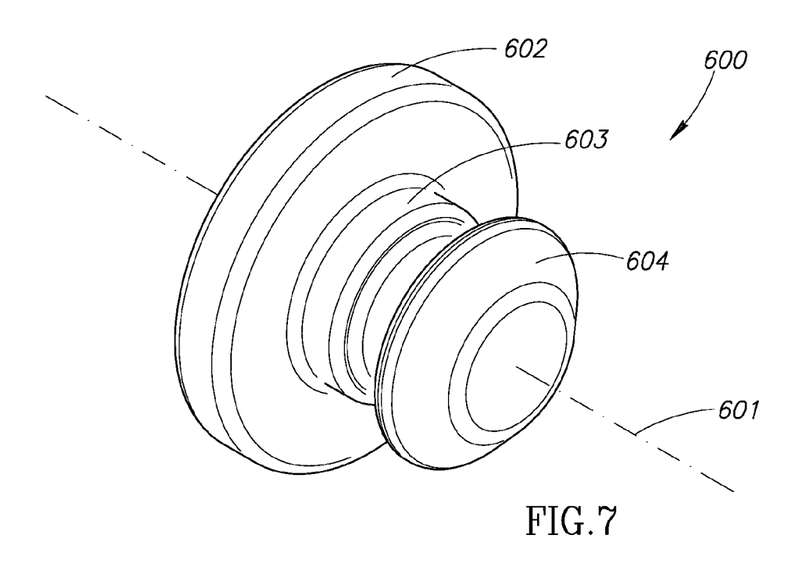
FIG. 7 shows a perspective view of a discrete one-piece stud-like fastener in accordance with the present invention.
Figure 8:
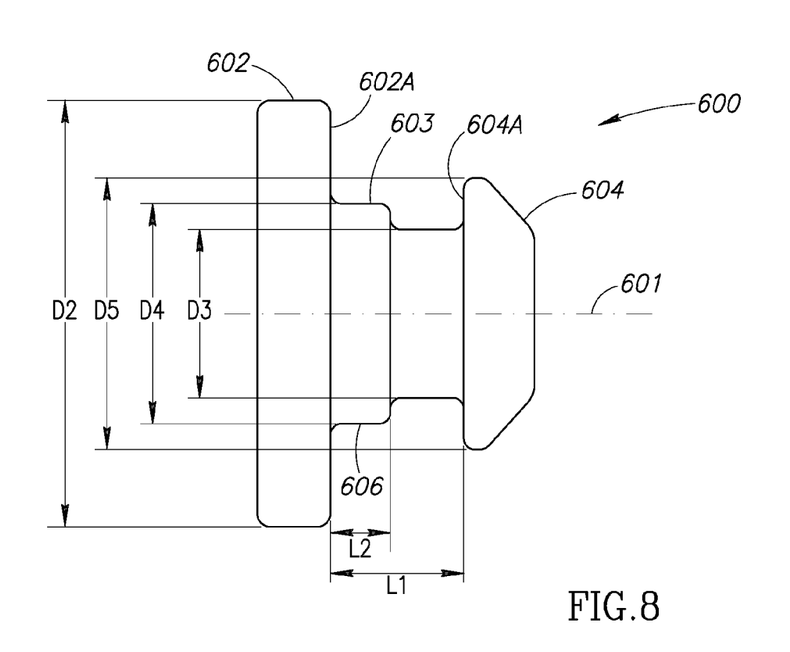
FIG. 8 shows a side elevation view of FIG. 7's fastener.

FIGS. 7 and 8 show a discrete one-piece stud-like fastener 600 to replace a fastening screw 401 and a fastening element 402 for mounting the storage bin 300 on the support structure 200. The stud-like fastener 600 has a rotation axis 601 and includes a fastener head 602, an intermediate fastener shank 603, and a fastener tip 604. The stud-like fasteners 600 do not have to be rotational bodies as long as their component parts satisfy the dimension constraints as described below.

The fastener head 602 is preferably disk-like with a diameter D2 equal to the support rail channel width W1 for enabling snug receiving of the fastener head 602 in a support rail channel 516. The fastener head 602 has a leading fastener head surface 602A for bearing against a front support rail wall's internal surface 511A. The diameter D2 is greater than the aperture diameter D1 to prevent the fastener 600 being able to transverse a hanging slot 308.

The fastener shank 603 has an overall length L1 equal to the rear storage bin wall thickness T1 and front support rail wall thickness T2 and a diameter D3 equal to the aperture width W3. The fastener shank 603 preferably includes a fastener disk 606 adjacent the fastener head 602 and having a diameter D4 equal to the support rail slot width W2 for enabling snug insertion of the fastener disk 606 in a support rail slot 517. The fastener disk 606 has a length L2 equal to the rear storage bin wall thickness T1.

The fastener tip 604 has a frusto-conical shape converging away from the fastener head 602. The fastener tip 604 has a trailing fastener tip surface 604A for bearing against the internal rear storage bin surface 511A. The trailing fastener tip surface 604A has a diameter D5 equal to the diameter D1 for enabling insertion of the fastener tip 604 through a lowermost circular aperture 308A.

Figures 9, 10:
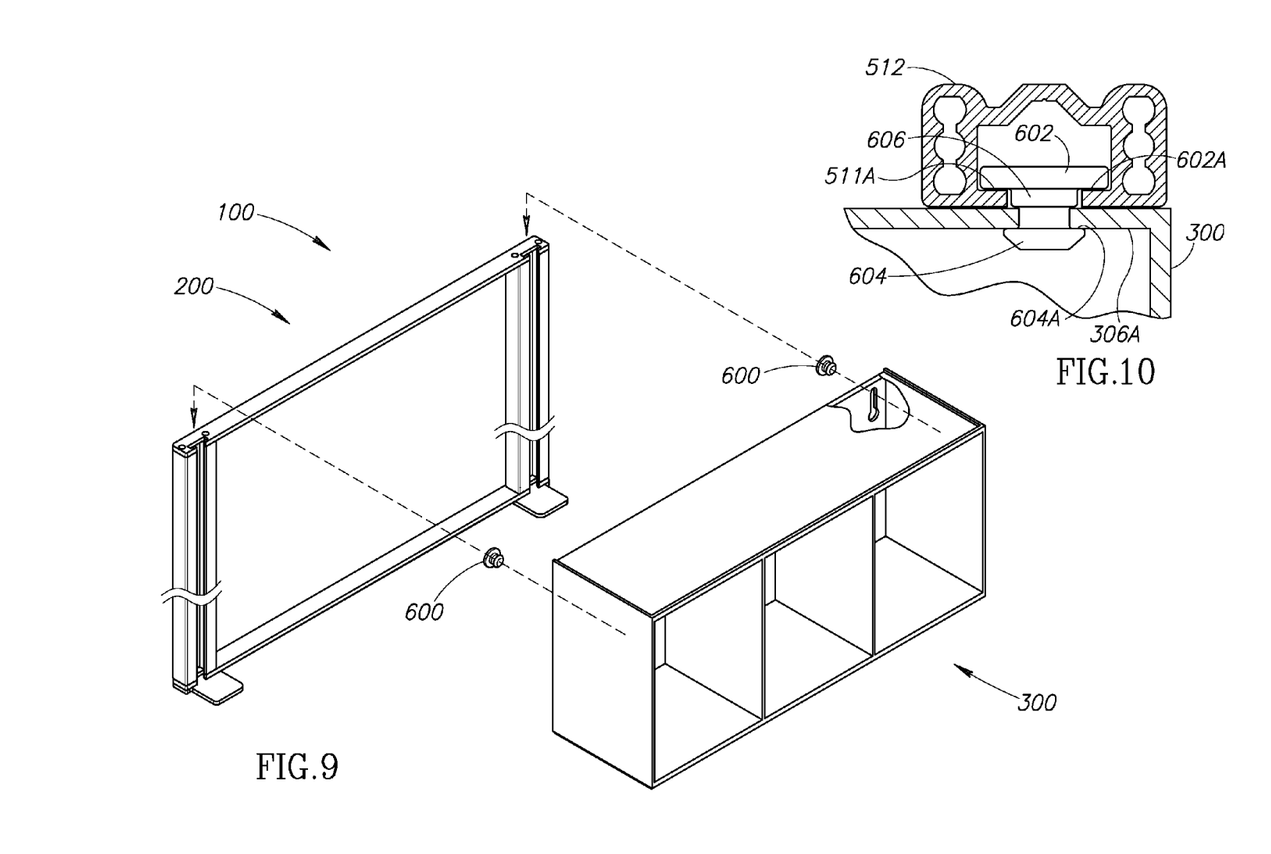
FIG. 9 shows a front perspective view of FIG. 1's modular storage system including the use of a pair of fasteners.
FIG. 10 is a transverse cross section of FIG. 1's support rail along line A-A showing the use of the fastener for mounting the storage bin on the right vertical support rail.

FIG. 9 shows FIG. 1's modular storage system 100 except with a pair of discrete stud-like fasteners 600 instead of the pair of fastening screws 401 and the pair of fastening elements 402. Mounting a storage bin 300 on the support structure 200 includes the following steps:

A user inserts a first fastener's fastener tip 604 through a first hanging slot's aperture 308 and a second fastener's fastener tip 604 through a second hanging slot's aperture 308 from the direction of the external rear storage bin surface 306B into the shell 301. Their fastener heads 602 stop against the external rear storage bin surface 306B. The user holds the storage bin 300 above the support structure 200 and aligns the fasteners 600 with the support rails 203 and 204. The user slides the storage bin 300 down onto the support structure 200 ensuring that the fastener heads 602 slide down into the support rail channels 516 and the fastener disks 606 slide down along the support rail slots 517.

FIG. 10 is similar to FIG. 6 except showing the use of the fastener 600 instead of a fastening screw 401 and a fastening element 402. Accordingly, the leading fastener head surface 602A bears against the internal surface 511A and the trailing fastener tip surface 604A bears against the internal surface 306A.

Kit for Assembling a Support Structure

FIGS. 11 to 14 show a kit 700 for assembling the support structure 200 for supporting the storage bin 300. The kit 700 has the same parts as the kit 500 except the former 700 includes a pair of identical spacers 701 instead of the pair of identical spacers 530. The spacers 701 are preferably made from suitable injection molding material, for example, polypropylene, ABS, polystyrene, and the like. The spacers 701 preferably have a ribbed construction for affording mechanical strength. The spacers 701 include spacer ends 702 and 703 and are preferably assembled from a first spacer member 704 and a second spacer member 706. The first spacer member pair 704 is preferably readily distinguishable from the second spacer member pair 706 for identification purposes. For example, spacer member pairs can be color coded, etc.

Figure 11:
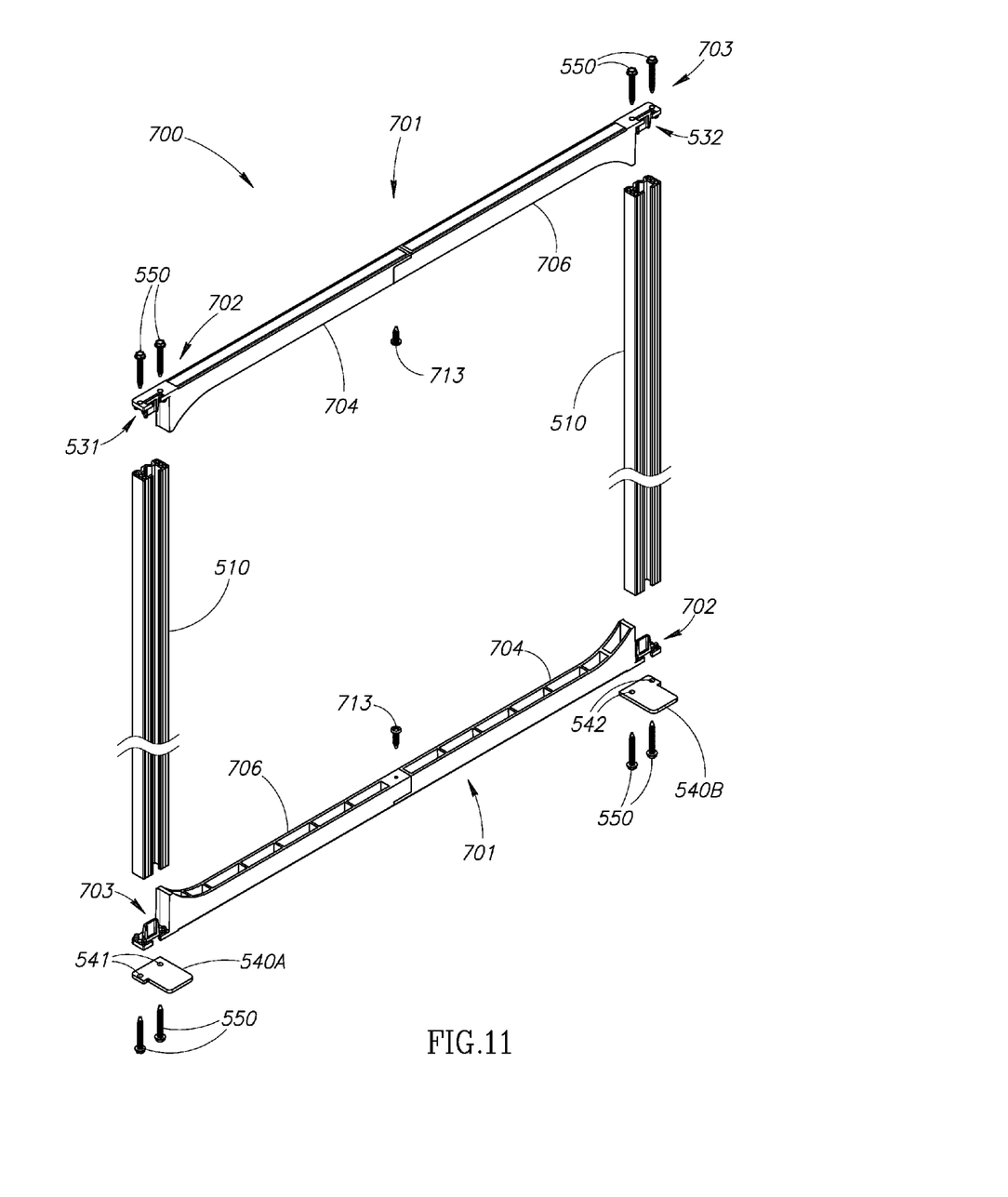
FIG. 11 shows a perspective view of a kit for assembling a support structure in accordance with the present invention.
Figure 12:
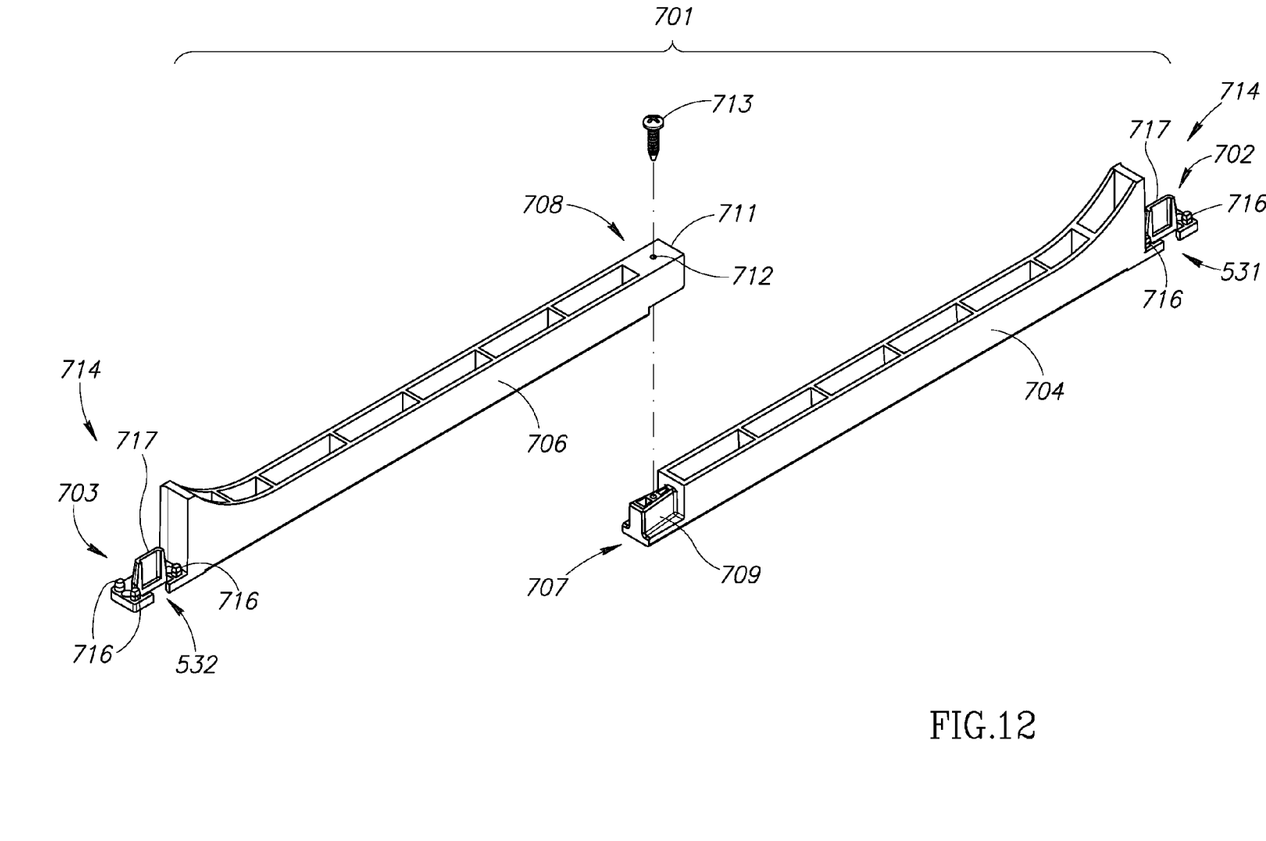
FIG. 12 shows a perspective view of a dissembled spacer.
Figure 13:
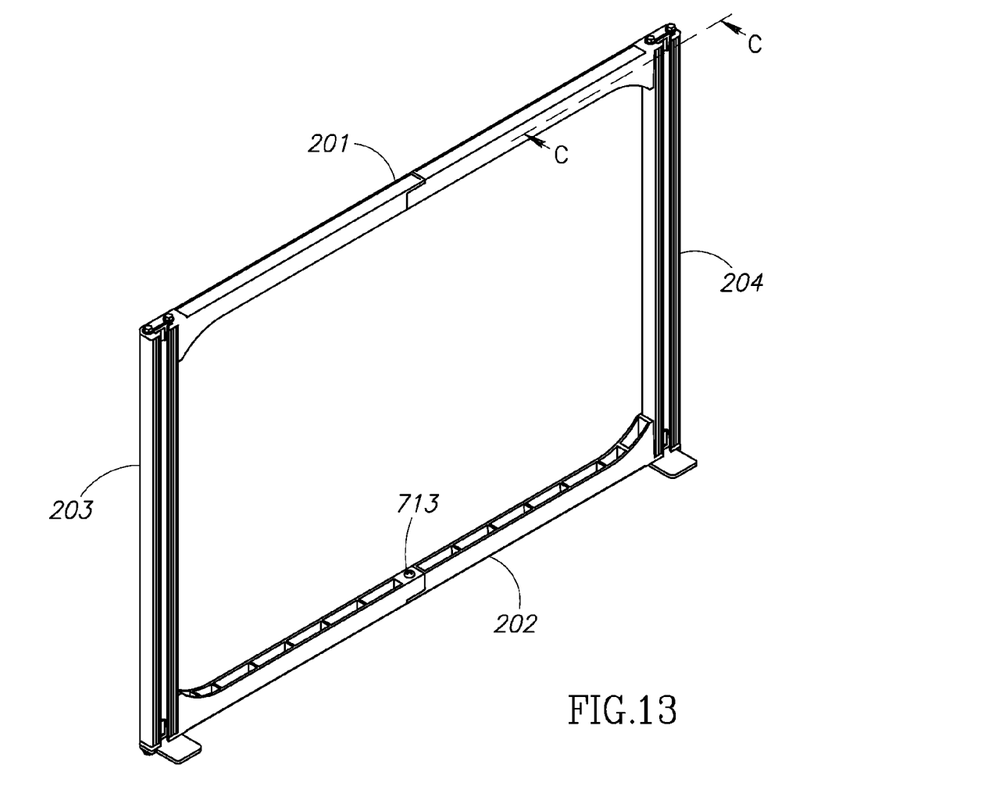
FIG. 13 shows a perspective view of an assembled support structure in accordance with the present invention.

Each first spacer member 704 includes a spacer end 702 and a spacer member end 707 for connection with a second spacer member 706. Each second spacer member 706 includes a spacer end 703 and a spacer member end 708 for connection with a first spacer member 702. The spacer member end 707 includes a male connector 709 for mating onto a female connector 711 at the spacer member end 708. The female connector 711 is formed with a throughgoing bore 712 for receiving a spacer assembly screw 713 for screw assembling the spacer member end 708 onto the spacer member end 707.

The spacer ends 702 and 703 are similar to the spacer ends 531 and 532 insofar as the spacer end 702 includes a T-shaped cutaway 533 and a pair of throughgoing holes 534 and the spacer end 702 includes a T-shaped cutaway 536 and a pair of throughgoing holes 537. The spacer ends 702 and 703 differ from the spacer ends 531 and 532 insofar that they additionally include integrally formed inter-engagement arrangement 714 for snug insertion into left and right vertical support rails 203 and 204 on mounting a spacer 701 thereon.

The inter-engagement arrangements 714 include two or more upright pins 716 for snug insertion into a front channel segment 519, a rear channel segment 521, a front channel segment 524 and a rear channel segment 526 of a support rail 510. FIG. 10 shows an inter-engagement arrangement 714 including four upright pins 716 for better steadying the spacer 601 in a support rail 510.

Figure 14:
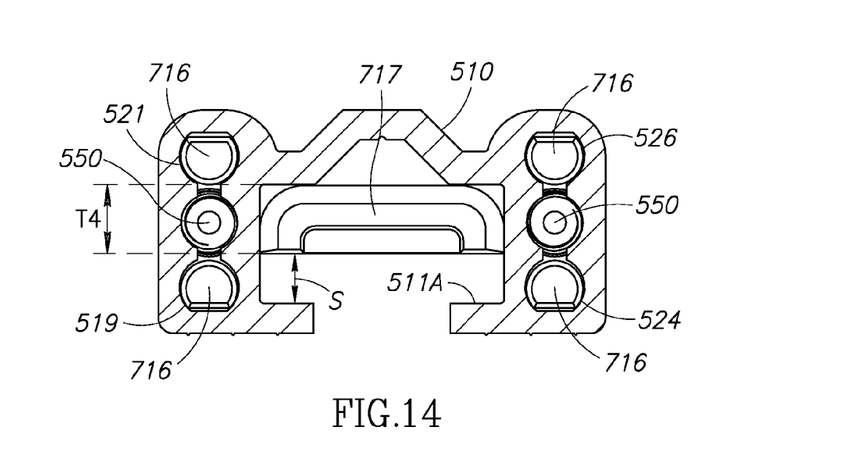
FIG. 14 shows a transverse cross section of FIG. 13's support rail along line C-C showing the mounting of a spacer end thereon.

The inter-engagement arrangements 714 preferably also include a central upright projection 717 for snug insertion widthwise into a support rail channel 516. The central upright projection 717 has a width W1 and a thickness T4 which leaves a separation S from the front support rail wall's internal surface 511A thereby enabling free passage of a fastener 600 down the support rail channel 516 for mounting a storage bin 300 onto a support structure 200. Alternatively, an inter-engagement arrangement 714 can includes a central upright projection 717 without upright pins 716.

While the invention has been described with respect to a limited number of embodiments, it will be appreciated that many variations, modifications, and other applications of the invention can be made within the scope of the appended claims.

The invention claimed is:

1. A kit for assembling a rectangular rigid support structure of a modular storage system, the kit comprising:
    (a) a left vertical support rail and a right vertical support rail, each said vertical support rail having a generally U-shaped transverse cross section and including a front support rail wall, a rear support rail wall and a pair of opposite left and right support rail walls extending between said front support rail wall and said rear support rail wall for defining a longitudinal directed support rail channel having a longitudinal directed support rail slot formed in said front support rail wall,
    said left support rail wall having a longitudinal directed channel including a front channel segment adjacent said front support rail wall, a rear channel segment adjacent said rear support rail wall and an intermediate channel segment connecting said front channel segment and said rear channel segment,
    said right support rail wall having a longitudinal directed channel including a front channel segment adjacent said front support rail wall, a rear channel segment adjacent said rear support rail wall and an intermediate channel segment connecting said front channel segment and said rear channel segment; and
    (b) a pair of spacers for spacing apart said left and right vertical support rails wherein each said spacer includes a pair of opposite spacer ends for mounting on said left and right vertical support rails,
    said pair of opposite spacer ends having a T-shaped cutaway for registration with corresponding ones of said longitudinal directed support rail channels of said left and right vertical support rails and each spacer end including an integrally formed inter-engagement arrangement for snug insertion into a respective one of said left and right vertical support rails when said spacer is mounted thereon, and wherein each said inter-engagement arrangement includes at least two upright pins for snug insertion into corresponding ones of said front channel segment and said rear channel segment of said left support rail and said front channel segment and said rear channel segment of said right support rail.

2. The kit according to claim 1 wherein each said inter-engagement arrangement further includes a central upright projection for snug insertion widthwise into a corresponding one of said support rail channels of said support rails.

3. The kit according to claim 1 wherein each said spacer includes a first spacer member and a second spacer member, said first spacer member having a spacer member end for connection with said second spacer member and said spacer end for mounting on said left vertical support rail, and said second spacer member having a spacer member end for connection with said first spacer member and said spacer end for mounting on said right vertical support rail.

* * * * *